United States Patent [19]

Mayle

[11] Patent Number: 4,861,219

[45] Date of Patent: * Aug. 29, 1989

[54] APPARATUS FOR LIFTING AND CARRYING HEAVY LOADS

[76] Inventor: Steven R. Mayle, 153 St. Thomas Dr., Fremont, Ohio 43420

[*] Notice: The portion of the term of this patent subsequent to Apr. 26, 2005 has been disclaimed.

[21] Appl. No.: 151,919

[22] Filed: Feb. 3, 1988

Related U.S. Application Data

[63] Continuation-in-part of Ser. No. 23,723, Mar. 9, 1987, Pat. No. 4,740,131.

[51] Int. Cl.$^4$ ............................................. B60P 3/00
[52] U.S. Cl. ................................. 414/469; 212/218; 280/47.11; 298/19 V; 414/460; 414/461; 414/911
[58] Field of Search .................... 414/459–461, 414/908, 910, 911, 495, 540, 544, 506, 592, 498, 608, 426, 427, 469, 546, 559, 667, 671, 556, 557, 543, 544; 298/19 V, 21 V; 212/218, 219, 255, 211, 260, 71, 83, 97, 98, 205, 208, 220; 187/8.5, 11, 20, 21, 9 R, 9 E; 280/47.11, 659, 47.16, 43.12

[56] References Cited

U.S. PATENT DOCUMENTS

| | | | |
|---|---|---|---|
| 447,606 | 3/1891 | Gardner | 280/47.16 X |
| 1,016,381 | 2/1912 | Watson | 280/659 |
| 1,175,312 | 3/1916 | Simpson | 280/47.11 |
| 2,657,938 | 11/1953 | Browne et al. | 414/460 X |
| 2,702,139 | 2/1955 | Faustine | 414/461 |
| 3,541,598 | 11/1970 | Dousset | 414/459 |
| 3,750,811 | 8/1973 | Anderson et al. | 414/460 |
| 3,759,409 | 9/1973 | Wenzel et al. | 414/460 |
| 3,831,791 | 8/1974 | Gonzales | 414/461 |
| 4,044,907 | 8/1977 | Craft | 414/911 X |
| 4,295,777 | 10/1981 | Bell et al. | 414/911 X |
| 4,502,568 | 3/1985 | Lebre | 414/667 X |
| 4,505,489 | 3/1985 | Specie | 280/659 X |
| 4,573,846 | 3/1986 | Willbanks et al. | 414/911 X |
| 4,657,469 | 4/1987 | Beierle et al. | 414/911 X |
| 4,690,376 | 9/1987 | Duncan | 414/911 X |
| 4,740,131 | 4/1988 | Mayle | 414/460 |

FOREIGN PATENT DOCUMENTS

| | | | |
|---|---|---|---|
| 116353 | 3/1969 | Norway | 280/43.12 |
| 275559 | 8/1951 | Switzerland | 212/218 |
| 885599 | 12/1961 | United Kingdom | 187/8.5 |
| 2132568 | 7/1984 | United Kingdom | 298/19 V |

Primary Examiner—David A. Bucci
Attorney, Agent, or Firm—Marshall & Melhorn

[57] ABSTRACT

An apparatus for lifting and carrying heavy loads includes a generally horizontally extending support beam attached between a pair of generally vertically extending posts. The distance between the ends of the support beam is selectively adjustable. The bottom end of each support post is attached to a side beam and the side beams are connected together at a front end by a steering mechanism and at a rear end by a beam assembly. Both the steering mechanism and the beam asssembly are selectively adjustable to vary the distance between the side beams to correspond to the distance between the ends of the support beam thereby maintaining the posts in a generally parallel relationship. The side beams are also selectively adjustable to vary the length of the load carrying apparatus. Ground engaging wheels are rotatably attached to the side beams and the steering mechanism. A load carrying bar is connected by cable to a winch which is mounted on the support beam for releasably engaging and lifting a heavy load such as a roll of roofing material. The bar can be replaced by a load carrying pan attached at one edge to the cable and rotatably attached at an opposite edge to the side beams.

14 Claims, 4 Drawing Sheets

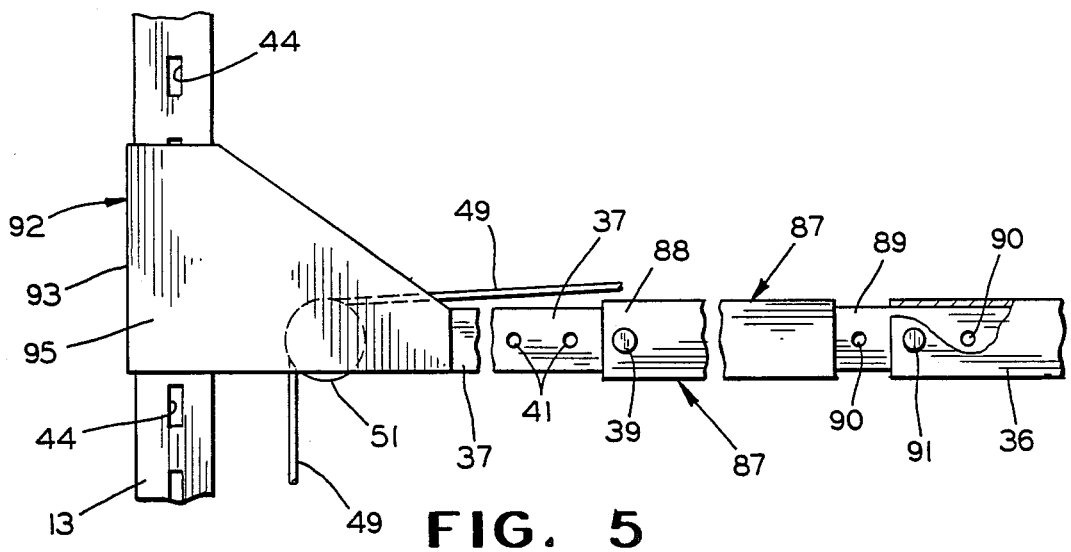
FIG. 5
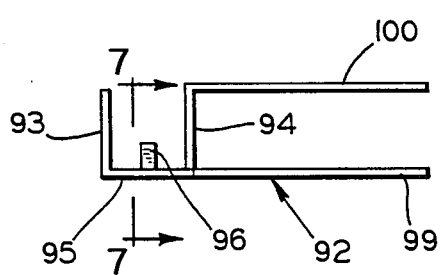
FIG. 6
FIG. 7
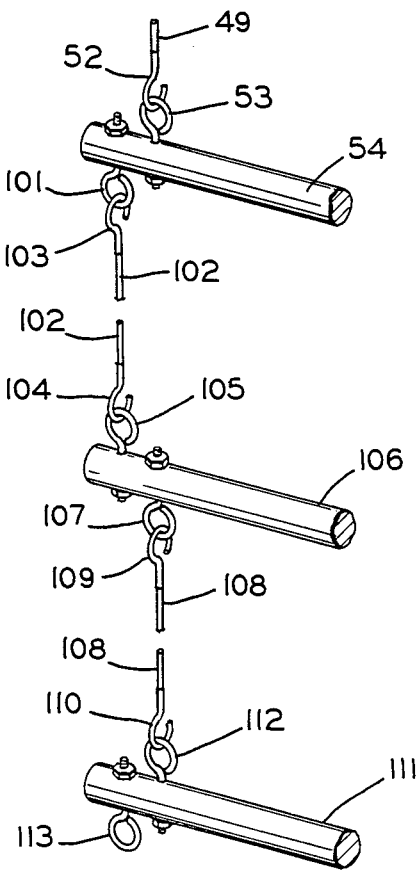
FIG. 8

4,861,219

APPARATUS FOR LIFTING AND CARRYING HEAVY LOADS

CROSS-REFERENCE TO RELATED APPLICATION

This application is a continuation-in-part of copending application Ser. No. 07/023,723, filed March 9, 1987, now U.S. Pat. No. 4,740,131.

BACKGROUND OF THE INVENTION

The present invention relates in general to an apparatus for lifting and carrying large, heavy loads and, in particular, to an apparatus for moving objects on the roof of a building.

Many commercial buildings are constructed with a relatively flat roof. Such roofs are typically covered with strips of roofing material which are delivered to the building site in large, heavy rolls. These rolls must be lifted to the roof of the building and then typically moved by hand by the workers installing the roofing material. Such an operation is difficult and time consuming. Repair operations also can require the movement of the old roofing materials and objects such as air conditioning units across the roof.

SUMMARY OF THE INVENTION

The present invention relates to an apparatus for lifting and carrying large, heavy objects and is especially adapted for moving rolls of roofing material on a building roof. The frame of the apparatus can be easily disassembled for movement between the ground and the roof of the building. Furthermore, the frame incorporates adjustments for width, length and height in order to accommodate different size loads. A generally horizontally extending support beam is releasably attached at opposite ends to a pair of spaced apart generally vertically extending posts. The lower end of each post is attached to a generally horizontally extending side frame having a ground engaging rotatably attached wheel at one end and a steering mechanism support attached at the other end.

The steering mechanism includes a steerable centrally mounted wheel assembly attached to a steering and pulling handle. The rear end of the frame includes a removable connecting bar which permits the frame to be backed up to a roll with the side frames adjacent either end of the roll. A supporting bar is adapted to extend through the center of a roll and has its ends attached to cables which are connected to a winch mounted on the support frame. The winch is utilized to raise the roll for movement along the roof and then lower the roll for dispensing the roofing material. The support bar includes adjustable means for changing the width or distance between the vertical support posts and also includes means for adjusting the height of the support bar with respect to the vertical posts.

The frame can include caster wheels at each front corner mounted slightly above ground level for engaging the ground should a supported load tip the frame toward either side. Multiple support bars can be utilized for suspending smaller diameter rolls one above the other or a hinged pan can be attached to the support beam for carrying and dumping waste materials.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 5 is an enlarged fragmentary front elevational view of an alternate embodiment of the vertical positioning mechanism of the apparatus shown in FIG. 1;

FIG. 6 is a top plan view of the releasable attaching mechanism shown in FIG. 5;

FIG. 7 is an enlarged fragmentary cross-sectional view taken along the line 7—7 of FIG. 6;

FIG. 8 is an enlarged fragmentary perspective view of an alternate embodiment of the load carrying bar shown in FIG. 1;

DESCRIPTION OF THE PREFERRED EMBODIMENT

Figure 1:
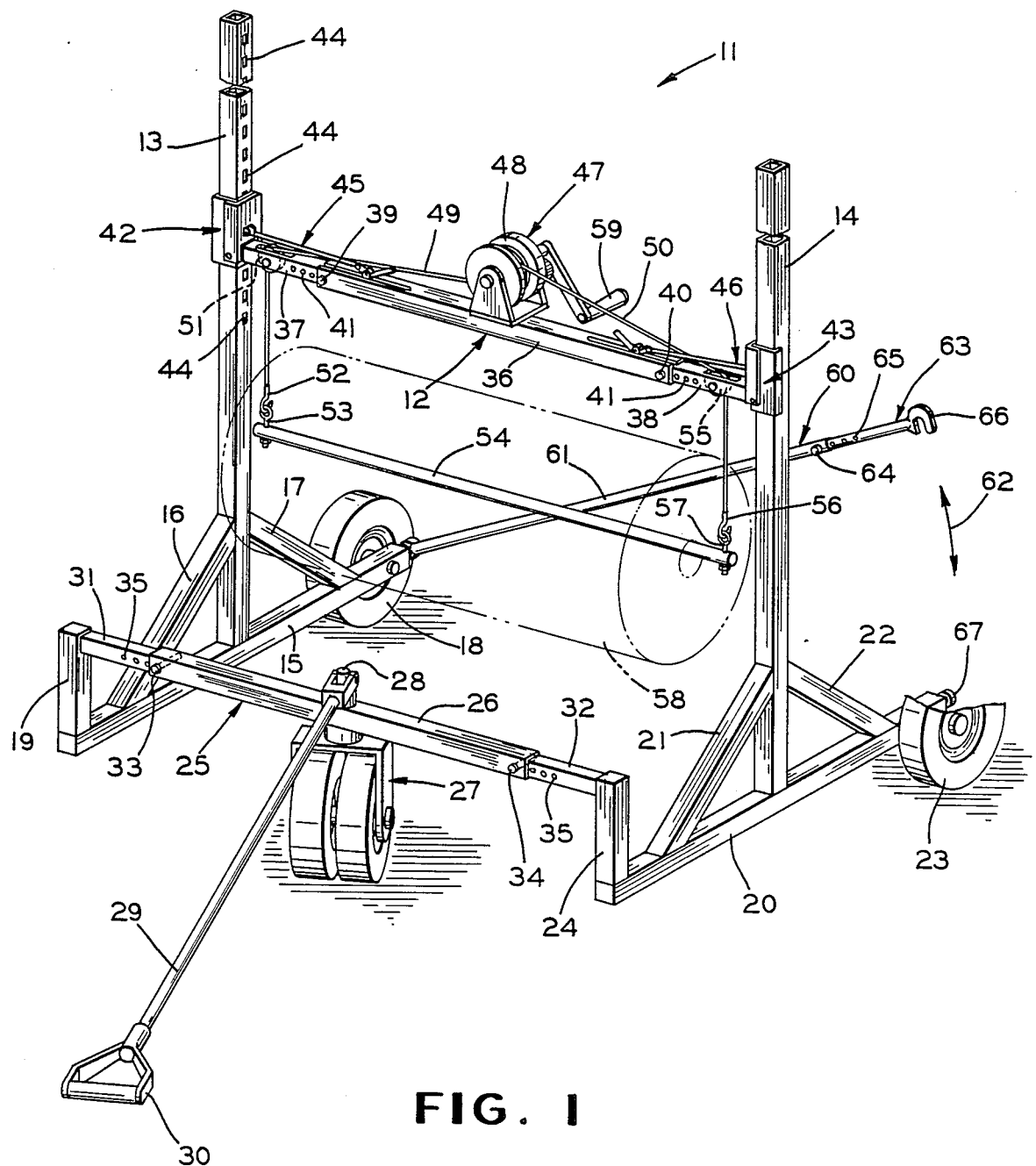
FIG. 1 is a perspective view of a load lifting and carrying apparatus according to the present invention.
Figure 2:
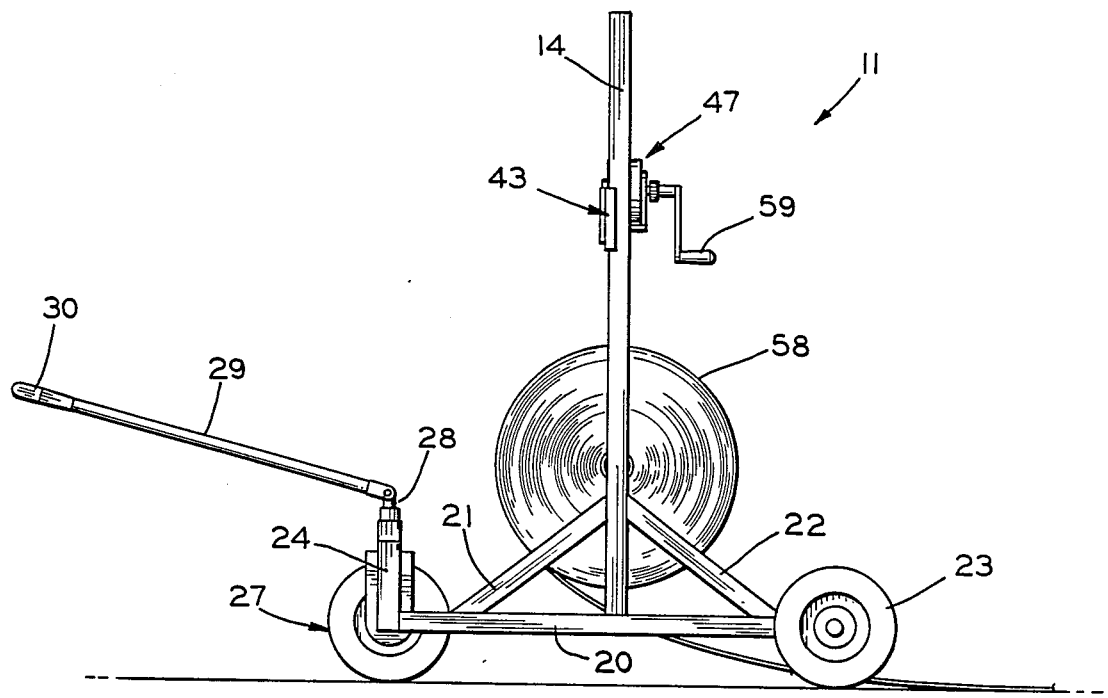
FIG. 2 is a side elevational view of the apparatus shown in FIG. 1 carrying a roll of roofing material.

A lifting and carrying apparatus 11 according to the present invention is shown in FIGS. 1 and 2. The apparatus 11 includes a generally horizontally extending support beam 12 attached at opposite ends to a pair of generally vertically extending posts 13 and 14. A lower end of the post 13 is attached to a central portion of a generally horizontally extending side beam 15. A pair of bracing beams 16 and 17 are attached to and extend between the vertical post 13 and the side beam 15 on opposite sides of the point of connection between the post 13 and the beam 15.

A ground engaging wheel 18 is rotatably attached at a rear end of the side beam 15. At the forward end of the side beam 15 there is attached a generally vertically extending, relatively short connector beam 19. The opposite side of the apparatus 11 is similar in construction with a lower end of the vertical post 14 attached to a side beam 20. A pair of bracing beams 21 and 22 extend between the post 14 and the side beam 20. A ground engaging wheel 23 is rotatably attached to a rear end of the side beam 20 and a short connector beam 24 extends vertically from and is attached to a front end of the side beam 20.

The upper ends of the connector beams 19 and 24 are attached to opposite ends of a steering mechanism 25. The steering mechanism 25 includes a generally horizontally extending tubular steering beam 26 upon which is mounted a steering wheel assembly 27. The steering wheel assembly 27 is rotatably mounted about a vertical axis. Although dual wheels are shown, a single wheel assembly or any other type of known steering mechanism can be utilized. An upper end 28 of the steering wheel assembly 27 extends above the upper surface of the steering beam 26 and is attached to one end of a steering rod 29. The opposite end of the steering rod 29 has a handle 30 attached thereto which handle is adapted to be griped by a human hand. The rod 29 is pivotally attached to the upper end 28 for rotation about a generally horizontal axis to enable the handle 30 to be positioned at an appropriate height for an operator. Thus, the operator can apply a force through the handle 30 and steering rod 29 to move the lifting and carrying apparatus 11 in a desired direction and can control the direction of movement through the rotation of the steering wheel assembly 27.

An outer end of each of a pair of generally horizontally extending adjustment beams 31 and 32 is attached to an upper end of a respective one of the connector beams 19 and 24. The opposite inner ends of the adjustment beams 31 and 32 extend inside open ends of the steering beam 26. A pair of locking pins 33 and 34 extend through apertures formed in the beam 26 and corresponding apertures formed in the adjustment beams 31 and 32 respectively to lock the steering mechanism 25 in place. The beams 31 and 32 each have a plurality of other apertures 35 formed therein for cooperation with the locking pins 33 and 34 to permit adjustment of the distance between the connector beams 19 and 24 thereby permitting the width of the lifting and carrying apparatus to be adjusted.

The horizontal support beam 13 also can be adjusted to maintain the distance between the vertical posts 13 and 14 in correspondence with the distance between the connector beams 19 and 24. A tubular mounting beam 36 extends in a generally horizontal direction between the vertical posts 13 and 14. A pair of adjustment beams 37 and 38 each have an outer end attached to a corresponding one of the vertical posts 13 and 14. The opposite inner ends of the adjustment beams 37 and 38 extend inside the open ends of the mounting beam 36. A pair of locking pins 39 and 40 extend through apertures formed in the ends of the tubular beam 36 and through corresponding apertures formed in the adjustment beams 37 and 38 respectively. The locking pins 39 and 40 can also cooperate with any of a plurality of other apertures 41 formed in the adjustment beams 37 and 38 to vary the distance between the vertical posts 13 and 14.

The horizontal support beam 12 is vertically adjustable. The adjustment beams 37 and 38 are attached to the vertical posts 13 and 14 respectively by a pair of sleeves 42 and 43 respectively. The sleeve 42 slidably engages the vertical post 13 and is attached to the adjustment beam 37. The sleeve 43 slidably engages the vertical post 14 and is attached to the adjustment beam 38. The vertical post 13 has a plurality of apertures 44 formed therein along a generally vertically extending axis and facing the end of the adjustment beam 37. A releasable locking mechanism 45 is attached between the mounting beam 36 and the sleeve 42 for engaging a selected one of the apertures 44 thereby locking the horizontal support beam 12 at a desired vertical height. A second releasable locking mechanism 46 is attached between the tubular beam 36 and the sleeve 43 and operates in a similar manner to engage apertures (not shown) formed in the vertical post 14. The locking mechanisms 45 and 46 will be discussed in more detail with reference to FIG. 3.

A winch 47 is mounted on an upper surface of the mounting beam 36. The winch 47 includes a drum 48 to which are attached one end of each of a pair of cables 49 and 50. The cable 49 extends around a pulley 51 rotatably mounted inside the adjustment beam 37. The opposite end of the cable 49 is attached to a hook 52 which engages an eye of an eye bolt 53. The opposite end of the eye bolt 53 is attached to one end of a load carrying bar 54. Similarly, the cable 50 extends around a pulley 55 rotatably mounted inside the adjustment beam 38. The opposite end of the cable 50 is attached to a hook 56 which engages an eye of an eye bolt 57. The eye bolt 57 is attached to the opposite end of the load carrying bar 54. Thus, the hooks 52 and 56 can be disengaged from the respective eye bolts 53 and 57 to release the load carrying bar 54. The bar 54 can be inserted through the center of a roll of roofing material 58 (shown in phantom). The hooks 52 and 56 can be re-engaged with the eye bolts 53 and 57. The roll 58 can be raised by rotating a crank arm 59 attached to the drum 48. Typically, the winch 47 includes a ratching mechanism with a reversible dog for permitting both raising and lowering of the load carrying bar 54 and its associated load. Although a roll 58 of roofing material is shown, the present invention can be utilized to lift and carry many different large and/or heavy loads.

In order to provide additional rigidity to the apparatus 11, the ends of the side beams 15 and 20 to which the wheels 18 and 23 are attached are connected together by a rear beam assembly 60. The beam assembly 60 includes a tubular beam 61 having one end rotatably attached to the side beam 15 for rotation about a generally horizontal axis in the direction of an arrow 62. The opposite end of the tubular beam 61 is open and receives therein one end of an adjustment connector 63. The tubular beam 61 and the adjustment connector 63 are attached by a locking pin 64 which extends through apertures formed in the tubular beam 61 and corresponding apertures formed in the adjustment connector 63. The adjustment connector 63 has other apertures 65 formed therein for cooperating with the locking pin 64 in order to determine the distance between the ends of the side beams 15 and 20. The opposite end of the adjustment connector 63 has a generally U-shaped downwardly facing hook 66 attached thereto for engaging a generally horizontally extending post 67 attached to an end of the side beam 20. Thus, opposite sides of the apparatus 11 are held in spaced apart relationship by the horizontal support beam 12, the steering mechanism 25, and the rear beam assembly 60. When it is desired to move the lifting and carrying apparatus 11 into position to pick up a load, the rear beam assembly 60 is rotated upwardly to a generally vertical position to enable the apparatus 11 to be backed toward the load until the horizontal support beam 12 is positioned above the load. The rear beam assembly 60 is lowered into the horizontal locking position to enable the load to be moved.

Figure 3:
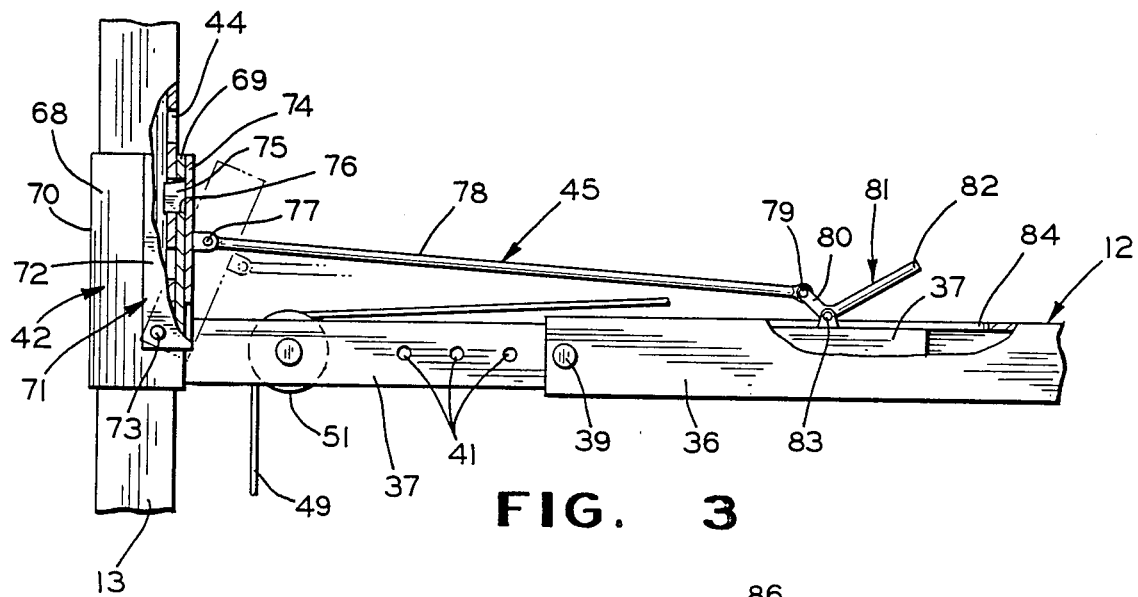
FIG. 3 is an enlarged fragmentary front elevational view of the vertical positioning mechanism of the apparatus shown in FIG. 1.

Referring to FIG. 3, there is shown in more detail the sleeve 42 and the releasable locking mechanism 45. The sleeve 42 has a generally U-shaped body having a front wall 68 attached to generally parallel spaced apart inner side wall 69 and outer side wall 70. The spacing between the side walls 69 and 70 corresponds to the width of the vertical post 13 to enable the sleeve 42 to slidably engage the outer surfaces of the post 13. An L-shaped bracket 71 has a front wall 72 abutting the front wall 68 and pivotally connected at 73 thereto. A side wall 74 of the bracket 71 abuts the inner side wall 69 of the sleeve 42. A lug 75 is formed on a surface of the side wall 74 facing the vertical post 13. The lug 75 extends through an aperture 76 formed in the inner side wall 69 and engages one of the apertures 44 formed in the vertical post 13. Thus, the sleeve 42 is locked against vertical movement along the vertical post 13.

An outer surface of the side wall 74 is pivotally connected at 77 to one end of a link arm 78 of the releasable locking mechanism 45. The opposite end of the link arm 78 is pivotally connected at 79 to a shorter arm 80 of a lever 81. The lever 81 is generally L-shaped and has a longer arm 82 attached to the shorter arm 80. The junction of the arms 80 and 82 is pivotally connected at 83 to an upper surface of the adjustment beam 37. The pivotal connection 83 extends through a slot 84 formed in an upper surface of the tubular beam 36. The slot 84 is dimensioned to permit movement of the pivotal connection 83 in accordance with the selected engagement of the locking pin 39 with any of the apertures 41. When downwardly directed pressure is applied to the lever arm 82, the lever 81 pivots about the pivot point 83 thereby causing the bracket 71 to pivot about the pivot point 73 and move to a disengaged position as shown in phantom. Such movement disengages the lug 75 from the selected one of the apertures 44 thereby permitting the entire horizontal support beam 12 to be moved away from the vertical post 13. The sleeve 43 and releasable locking mechanism 46 are similar in construction and operation.

Figure 4:
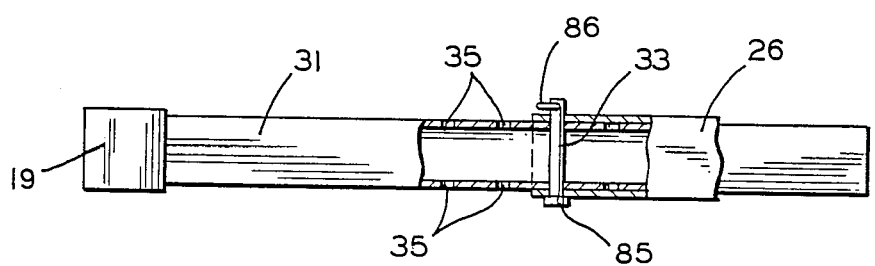
FIG. 4 is an enlarged top plan view of the width adjustment mechanism of the apparatus of FIG. 1.

There is shown in FIG. 4 the adjustment connection of the tubular beam 26 and the adjustment beam 31. The tubular beam 26 includes a pair of apertures through which the locking pin 33 extends. The adjustment beam 31 has a plurality of pairs of apertures 35 formed therein any pair of which can be aligned with the apertures in the tubular beam 26 for accepting the locking pin 33. One end of the locking pin 33 has an enlarged head 85 formed thereon. The opposite end of the locking pin 33 can have an aperture formed therein for accepting a retention means such as a cotter pin 86.

The lifting and carrying apparatus 11 according to the present invention can be disassembled for transportation both to the job site and from the ground to the roof of a building. The locking pins 33 and 34 can be removed to disengage the tubular beam 26 and associated steering wheel assembly 27. The releasable locking mechanisms 45 and 46 can be actuated to disengage the horizontal support beam 12 from the vertical posts 13 and 14. The rear beam assembly 60 can be releasably attached to the side beam 15 for disassembly. If necessary, one or more of the subassemblies can be designed to be broken down into additional subassemblies for ease of storage and transportation. The subassemblies are easily reassembled and the apparatus 11 is ready for lifting and carrying large and heavy loads.

In FIG. 5 there is shown an alternative embodiment of the vertical positioning mechanism and adjustment beams for the support beam 12. The apparatus 11 shown in FIG. 1 can be manufactured in a standard size adjustable between a minimum and a maximum width. If it is desired to lift and carry loads which exceed the standard maximum width, a pair of extension beams can be utilized. For example, a tubular extension beam 87 is connected between the horizontal tubular beam 36 and the adjustment beam 37. An outwardly facing end 88 of the beam 87 has internal dimensions which permit insertion of the inwardly facing end of the adjustment beam 37. The locking pin 39 is inserted through an aperture (not shown) formed through the end 88 and engages one of the apertures 41 to firmly connect the adjustment beam 37 to the extension beam 87. An inwardly facing end 89 of the extension beam 87 is formed of reduced dimensions similar to the dimensions of the adjustment beam 37 and extends inside the outwardly facing end of the tubular beam 36. The inwardly facing end 89 has a plurality of apertures 90 formed therethrough and one of the apertures 90 accepts a locking pin 91 which extends through an aperture (not shown) formed in the tubular beam 36. The extension beam 87 can be formed in several standard lengths to provide, for example, increases in width in a continuous series of ranges. Of course, corresponding adjustments are necessary in the steering mechanism 25 and the rear beam assembly 60.

Also shown in FIG. 5 is an adjustable attachment for connecting the support beam 12 to the vertical posts 13 and 14. The vertical post 13 is formed with the apertures 44 facing either the front or the rear of the apparatus 11. A sleeve 92 has a pair of substantially parallel extending side walls 93 and 94 joined by an end wall 95 to form a generally U-shaped sleeve for extending around three sides of the vertical post 13. As shown in FIG. 6 and FIG. 7, a generally L-shaped locking lug 96 is attached to an inner surface of the end wall 95 and has a downwardly extending portion 97 which is sized to pass through the apertures 44. The sleeve 92 is then lowered and a generally horizontally extending portion 98 of the locking lug 96 comes into contact with a bottom wall of the aperture 44. The sleeve 92 is thereby locked in place on the vertical post 13 until sufficient upward force is applied to raise the sleeve 92 such that the portion 97 can clear the bottom of the aperture 44. Of course, a similar sleeve and locking lug is provided at the opposite end of the support beam 12.

A pair of brace walls 99 and 100 extend in a generally parallel direction from opposite ends of the inner side wall 94. The brace walls 99 and 100 are attached to front and rear surfaces of the adjustment beam 37 in the area of the pulley 51. Thus, means for releasably attaching each end of a support beam to a corresponding one of the vertical posts 13 and 14 is provided.

There is shown in FIG. 8 an alternate embodiment of the load carrying bar 54 shown in FIG. 1. A second eye bolt 101 is attached to the load carrying bar 54. The eye bolt 101 is shown positioned between the eye bolt 53 and the end of the bar 54. However, the eye bolt 101 could have been positioned interiorly of the eye bolt 53. A relatively short length of cable 102 has a hook 103 attached at one end and a second hook 104 attached at the opposite end. The hook 103 engages the eye bolt 101 and the hook 104 engages an eye bolt 105 attached to a load carrying bar 106. Thus, a roll of roofing material can be carried on the bar 54 and a second roll of roofing material can be carried on the bar 106 suspended below the bar 54 by properly selecting the length of the cable 102.

The bar 106 has a second eye bolt 107 attached thereto. It can be seen that the eye bolt 107 corresponds to the eye bolt 53 and the eye bolt 105 corresponds to the eye bolt 101 such that the bar 54 and the bar 106 are substantially identical. A second cable 108 can be provided having a first hook 109 attached to one end and a second hook 110 attached to an opposite end. Thus, a third bar 111 having eye bolts 112 and 113 attached thereto can be suspended below the second bar 106 to retain a third roll of roofing material. Of course, FIG. 8 is representative of the attachments at the opposite ends of the bars 54, 106, and 111. The number of bars, and thus the number of rolls of roofing material which can be suspended, is only limited by the diameter of each of the rolls of roofing material.

Figure 9:
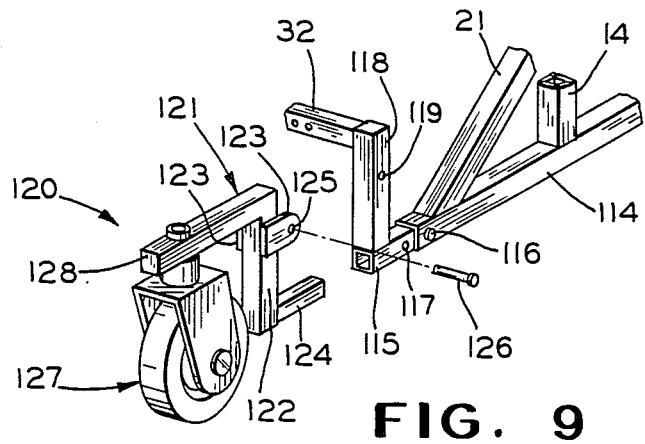
FIG. 9 is a fragmentary exploded perspective view of an alternate embodiment of the frame of FIG. 1 showing a side beam extension and caster wheel.

There is shown in FIG. 9 an alternate embodiment of the frame of the lifting and carrying apparatus 11 of FIG. 1. A generally horizontal side rail 114 is attached to the lower end of the post 14 and to the bracing beam 21. The side rail 114 is similar to the side beam 20 of FIG. 1, but a forward end of the side beam 114 is adapted to telescopically receive an extension tube 115. The extension tube 115 and the side beam 114 can be held together by any suitable fastener such as a locking pin 116 extending through apertures (not shown) formed in both the side beam 114 and the extension tube 115. A plurality of apertures, represented by an aperture 117 can be formed in the extension tube 115 to enable the length of the side beams to be adjusted selectively.

A generally vertically extending short connector beam 118 is connected between a free end of the extension tube 115 and an outer end of the adjustment beam 32. An aperture 119 is formed in the short connector beam 118 for attaching a caster assembly 120. The caster assembly 120 includes a bracket 121 having a generally vertically extending center body portion 122. A pair of ears 123 are attached to opposite sides of the center body portion 122 and are spaced apart a distance equal to the width of the connector beam 118. A lower leg 124 extends from a lower end of the center body portion 122 and is telescopically received in an open end of the extension tube 115. An aperture 125 is formed in each of the ears 123 at a position corresponding with the aperture 119 to receive a locking pin 126. Thus, the bracket 121 is firmly connected to the frame of the apparatus by the locking pin 126 cooperating with the ears 123 and the lower leg 124 cooperating with the extension tube 115. A caster wheel 127 is rotatably attached to an outer end of an upper leg 128 which has its opposite end attached to a top end of the center body portion 122. A similar caster assembly is attached to the side beam on the opposite side of the apparatus frame. The caster assemblies are dimensioned such that the caster wheels are approximately one half inch above the ground when the front steering wheels and the rear side beam wheels are resting on a level surface. If a heavy load would tend to tip the frame to one side or the other, one of the caster wheels would be lowered into engagement with the ground thereby stabilizing the apparatus.

Figure 10:
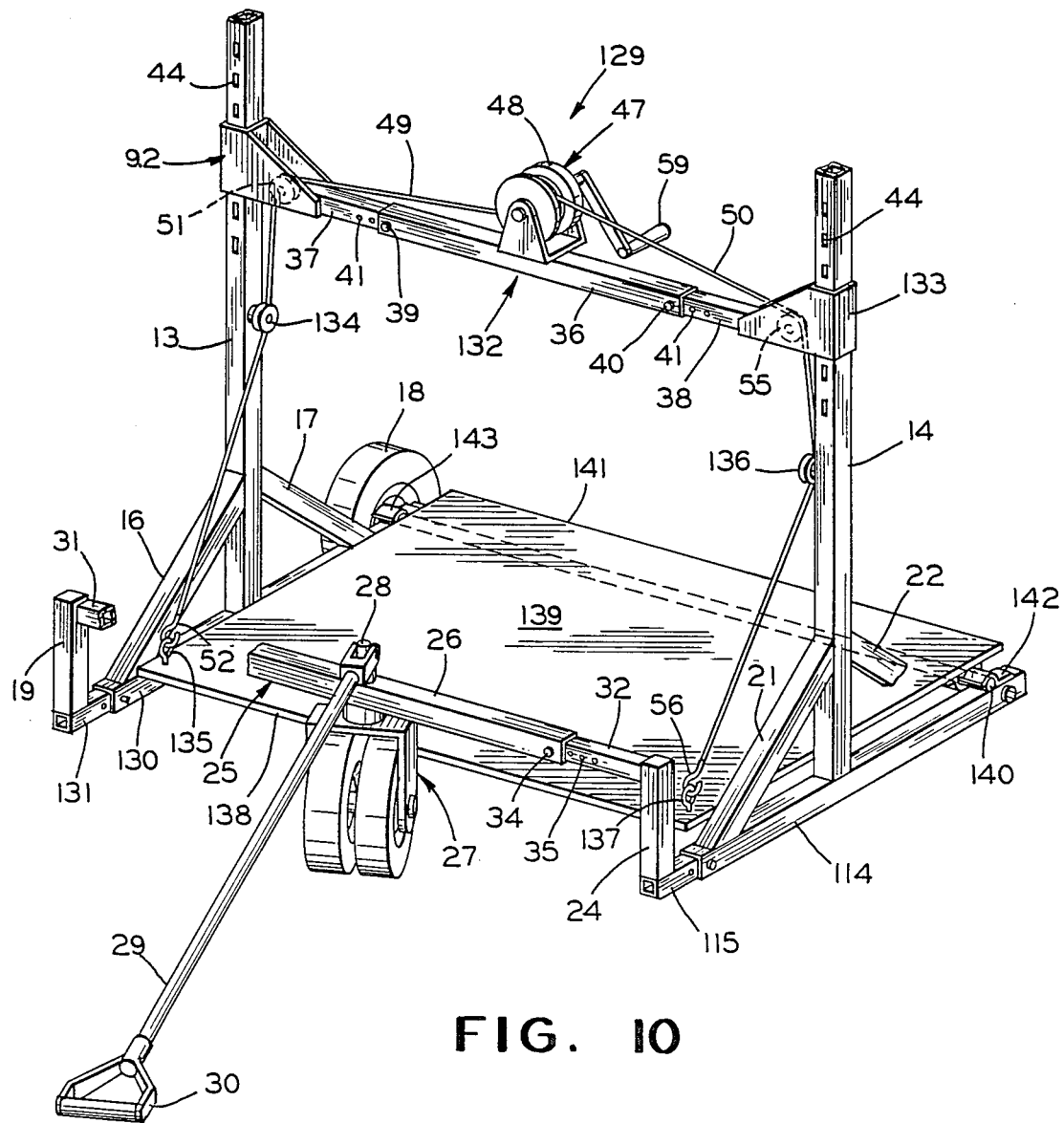
FIG. 10 is a fragmentary perspective view of an alternate embodiment of the frame of FIG. 1 showing a load supporting pan.

There is shown in FIG. 10 an alternate embodiment of the apparatus 11 shown in FIG. 1. Like elements have the same reference numerals. An apparatus 129 for lifting and carrying includes the side beam 114 and the extension tube 115 attached to the vertical post 14 as shown in FIG. 9. A similar side beam 130 and extension tube 131 are attached to the vertical post 13. A support beam assembly 132 is releasably attached at one end to the vertical post 13 by the sleeve 92 and is releasably attached at its opposite end to the vertical post 14 by a similar sleeve 133. The cable 49 attached to the winch 47 passes over the pulley 51 and around a second pulley 134 rotatably attached to an inner surface of the vertical post 13. The cable 49 terminates in the hook 52 which engages an eye bolt 135. Similarly, the cable 50 extends over the pulley 55 and around a second pulley 136 rotatably attached to an inner surface of the vertical post 14. The cable 50 terminates in the hook 56 which engages an eye bolt 137. The eye bolts 135 and 137 are attached at opposite corners of a forward edge 138 of a generally horizontally extending planar pan 139. A rod 140 extends underneath and across the width of the pan 39 adjacent a rear edge 141. The ends of the rod 140 are rotatably retained in a pair of clips 142 and 143 attached to the rearward ends of the side beams 114 and 130 respectively. The rod 140 is attached to the lower surface of the pan 139 such that when the winch is operated to retract the cables 49 and 50, the forward edge 138 of the pan 139 is raised and the pan pivots about the rod 140. Thus, any load resting upon the upper surface of the pan 139 will be dumped at the rear edge 141. The pan 139 is especially useful for hauling used roofing material which have been removed from an old roof across the roof to be dumped over the side of the associated building.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for lifting and carrying loads comprising:

a generally horizontally extending support beam including means for adjusting the distance between opposite ends of said support beam;

a pair of generally vertically extending posts each attached at a lower end to one of a pair of generally horizontally extending side beams with said side beams having at least one ground engaging wheel;

means for releasably attaching each said end of said support beam to a corresponding one of said posts including a sleeve attached to said support beam and slidably engaging one of said posts, and a releasable locking mechanism attached to said support beam and releasably engaging an aperture formed in said post;

means for adjusting the distance between said posts to correspond to the distance between said ends of said support beam including a tubular steering beam, a pair of adjustment beams connected at their outer ends to said side beams and telescopically engaging at their inner ends opposite ends of said steering beams and means for releasably attaching said adjustment beams to said steering beam;

a steering mechanism having at least one ground engaging wheel mounted on said steering beam for rotation about a generally vertical axis and a steering rod attached to said wheel;

means for adjusting the length of said side beams; and means attached to said support beam for releasably engaging and lifting a load.

2. The apparatus according to claim 1 wherein said support beam is tubular and said means for adjusting the distance between opposite ends includes a pair of support adjustment beams telescopically engaging said support beam at said opposite ends and means for releasably attaching said support adjustment beams to said support beam.

3. The apparatus according to claim 1 wherein said means for adjusting the distance between opposite ends includes a pair of extension beams telescopically engaging said support beam at said opposite ends and means for releasably attaching said extension beams between said support beam and said support adjustment beams.

4. The apparatus according to claim 3 wherein each said extension beam is tubular and has an outer end for telescopically receiving an inner end of a corresponding one of said support adjustment beams and an inner end for telescopically engaging one of said support beam opposite ends.

5. The apparatus according to claim 1 wherein said sleeve is generally U-shaped having generally parallel spaced apart side walls connected to an end wall, and said releasable locking mechanism includes a generally L-shaped locking lug attached to said end wall for engaging said aperture in said post.

6. The apparatus according to claim 1 wherein said means for releasably engaging and lifting a load includes a winch mounted on said support beam, a first load engaging bar, cable means connected between said winch and said bar, at least a second load engaging bar, and means for connecting said second load engaging bar to said first load engaging bar.

7. The apparatus according to claim 1 wherein said means for releasably engaging and lifting a load includes a generally planar pan, means for rotatably attaching opposite ends of one edge of said pan to said side beams, a winch mounted on said support beam, and cable means connected between said winch and an edge of said pan opposite said one edge for raising and lowering said opposite edge of said pan relative to said one edge.

8. The apparatus according to claim 1 wherein said side beams are tubular and said means for adjusting the length of said side beams includes a pair of side adjustment beams each telescopically engaging an end of one of said side beams and means for releasably attaching said side adjustment beams to said side beams.

9. The apparatus according to claim 1 wherein said ground engaging wheel is attached adjacent one end of a corresponding one of said side beams and said steering mechanism is attached at an opposite end of said side beams, and including a pair of caster wheels attached to said opposite ends of said side beams and spaced from the ground when said ground engaging wheels are positioned on the ground.

10. The apparatus according to claim 9 wherein said caster wheels are each removably attached to said side beams.

11. An apparatus for lifting and carrying loads comprising:
a generally horizontally extending support beam;
a pair of generally vertically extending posts each attached at a lower end to one of a pair of generally horizontally extending side beams;
means for releasably attaching said support beam to said posts including a pair of sleeves each slidably engaging a corresponding one of said posts and having a releasable locking mechanism engaging an aperture formed in each of said posts, and a pair of adjustment beams connected at their outer ends to said sleeves and telescopically engaging at their inner ends opposite ends of said support beam;
a steering mechanism attached to a generally horizontally extending steering beam and including at least one ground engaging wheel;
a pair of ground engaging wheels rotatably attached to said side beams;
means for adjusting the length of said side beams connected between said side beams and said steering beam; and
means attached to said support beam for releasably engaging and lifting a load.

12. The apparatus according to claim 11 wherein said side beams are tubular and said means for adjusting the length of said side beams includes a pair of side adjustment beams each telescopically engaging an end of a corresponding one of said side beams, said side adjustment beams being attached to said steering beam and means for releasably attaching said side adjustment beams to said side beams.

13. An apparatus for lifting and carrying loads comprising:
a generally horizontally extending support beam including means for adjusting the distance between opposite ends of said support beam;
a pair of generally vertically extending posts each having a lower end attached to at least one ground engaging wheel, means attached to said support beam for releasably engaging and lifting a load, and a plurality of vertically spaced apertures formed in said posts; and
means for releasably attaching each said opposite end of said support beam to a corresponding one of said posts, said means for releasably attaching including a generally U-shaped sleeve attached to said support beam and partially surrounding and slidably engaging an exterior surface of one of said posts with a pair of generally parallel spaced apart side walls connected to an end wall and further including a releasable locking mechanism having a generally L-shaped locking lug fixedly attached to a wall of said sleeve for engaging one of said apertures formed in said one post.

14. The apparatus according to claim 13 wherein said locking lug has a generally horizontally extending portion attached at one end to said end wall and attached at an opposite end to a generally downwardly extending portion.

* * * * *